(12) United States Patent
Ueno

(10) Patent No.: US 7,957,239 B2
(45) Date of Patent: Jun. 7, 2011

(54) OPTICAL DISK DRIVE FOR ADJUSTING POWER OF A RECORDING LASER

(75) Inventor: Keishi Ueno, Iruma (JP)

(73) Assignee: TEAC Corporation, Tama-shi, Tokyo (JP)

( * ) Notice: Subject to any disclaimer, the term of this patent is extended or adjusted under 35 U.S.C. 154(b) by 1126 days.

(21) Appl. No.: 11/715,784

(22) Filed: Mar. 7, 2007

(65) Prior Publication Data

US 2007/0211593 A1   Sep. 13, 2007

(30) Foreign Application Priority Data

Mar. 8, 2006 (JP) .................. 2006-062998
Mar. 8, 2006 (JP) .................. 2006-063002

(51) Int. Cl.
*G11B 15/52* (2006.01)

(52) U.S. Cl. .................. 369/47.53; 369/53.27

(58) Field of Classification Search .................. None
See application file for complete search history.

(56) References Cited

U.S. PATENT DOCUMENTS

| | | | |
|---|---|---|---|
| 7,120,099 B2 | 10/2006 | Imamura et al. | |
| 7,636,284 B2 * | 12/2009 | Jung et al. .................. | 369/47.53 |
| 2002/0136121 A1 * | 9/2002 | Salmonsen et al. ......... | 369/47.53 |
| 2003/0021199 A1 | 1/2003 | Suzuki | |
| 2003/0161237 A1 * | 8/2003 | Ogawa ......................... | 369/47.53 |
| 2004/0145978 A1 | 7/2004 | Yamamoto | |
| 2006/0098542 A1 * | 5/2006 | Kuwayama ................. | 369/47.5 |
| 2009/0028018 A1 * | 1/2009 | Shoji et al. ................. | 369/47.53 |

FOREIGN PATENT DOCUMENTS

| | | |
|---|---|---|
| JP | 7-153076 A | 6/1995 |
| JP | 2002157738 A | 5/2002 |
| JP | 2002-230769 A | 8/2002 |
| JP | 2003-36535 A | 2/2003 |
| JP | 2004-234812 A | 8/2004 |
| JP | 2004-342245 A | 12/2004 |
| JP | 2005243181 A | 9/2005 |
| JP | 2006-40328 A | 2/2006 |
| JP | 2006048736 A | 2/2006 |

OTHER PUBLICATIONS

Machine Translation of Sasaki et al. (JP2002230769), Publication date: Aug. 16, 2002.*
Notice of Grounds for Rejection mailed Nov. 10, 2009, issued in corresponding Japanese Application No. 2006-062998, filed Mar. 8, 2006.
Notice of Grounds for Rejection mailed Dec. 8, 2009, issued in corresponding Japanese Application No. 2006-063002, filed Mar. 8, 2006.

* cited by examiner

*Primary Examiner* — Paul Huber
(74) *Attorney, Agent, or Firm* — Seed IP Law Group PLLC

(57) ABSTRACT

In an optical disk drive, running OPC (ROPC) is performed without fail, to thus enhance recording quality. ROPC is performed by use of a remaining portion of an area for APC operation within an APC area of a recording unit (RUB) in a next-generation optical disk such as a blu-ray disk. ROPC is performed by means of tentatively writing test data having a length of 50 T longer than a specified length of data to be recorded; and detecting level B of the amount of light reflected at that time. The APC area is formed from five wobble periods. APC is performed in periods of first two wobbles, and ROPC is performed in remaining three wobble periods.

17 Claims, 12 Drawing Sheets

OPTICAL DISK DRIVE FOR ADJUSTING POWER OF A RECORDING LASER

PRIORITY INFORMATION

This application claims priority to Japanese Patent Application No. 2006-62998 filed on Mar. 8, 2006 and Japanese Patent Application No. 2006-63002 filed on Mar. 8, 2006, which are incorporated herein by reference in their entireties.

BACKGROUND OF THE INVENTION

1, Technical Field

The present invention relates to an optical disk drive, and more particularly, to adjustment of power of a recording laser beam.

2, Related Art

ROPC (running OPC) for detecting the quantity of light reflected from an optical disk during recording of actual data, to thus increase or decrease the power of a recording laser beam in accordance with the quantity of reflected light, has hitherto been put into practice, in conjunction with an OPC technique of recording test data by means of changing the power of the recording laser beam in various manners in a predetermined test area on the optical disk when data are recorded on the optical disk and reproducing the test data, to thus set optimal recording power in accordance with the quality of reproduction.

By means of ROPC, a level B portion—where pits are formed by means of a recording laser beam and where the quantity of light reflected from the pits, among the quantity of light reflected during recording of data, becomes stable—is detected by means of sampling, and the power of a recording laser beam is increased or decreased in accordance with the value of the level B. For instance, given that the power of a recording laser beam is taken as P and the value of the level B is taken as B, the power P of a recording laser beam is adjusted such that $B/P^n$ becomes constant, where "n" is set to, e.g., a value of two or the like.

The level B portion is preferably sampled by means of pits having the longest-possible data length, in consideration of the time required to make the level B portion stable, or in consideration of a filtering range or the like. For instance, in the case of a DVD, the quantity of reflected light is sampled into a data length of 9 T to 11 T, 14 T, and the like, thereby acquiring the value of the level B.

Japanese Patent Laid-Open Publication No. 2002-157738 describes an optical disk drive which rotates, at a constant angular velocity, a disk having, from an inner track to an outer track, a test write area, a buffer area, a lead-in area, a program area, and a lead-out area. The publication describes that a test signal is recorded in an outer peripheral area located outside the test write area and the lead-out area, and that the thus-recorded test signal is reproduced, to thus set the value of a laser output.

By means of ROPC, the level B is detected at a timing when data are recorded into a pit of the longest-possible length. However, the absolute time of a recording pulse becomes shorter in response to a request for increased data recording speed. Even when attention has been paid to a pit of long data length, considerable difficulty is encountered in stably detecting the level B.

When the type of an optical disk is changed, there is also presumed a case where a pit of longer data length is not present. For instance, in a blu-ray disk, which is one type of next-generation optical disk, the maximum data length is 8 T, and even a synchronous signal has a data length of only 9 T, and much greater difficulty is encountered in detecting the level B. There has also been known a "recalling method" comprising the steps of interrupting recording of data during recording operation, evaluating the quality of data recorded immediately before, and adjusting the power of the recording laser beam in accordance with a result of evaluation. When the power of the recording laser beam is adjusted by means of evaluating the quality of the data recorded immediately before and through use of a β value, a γ value, an error rate, it is necessary to know the manner of increasing or decreasing the power of the recording laser beam in relation to an evaluation parameter, such as the β value, the γ value, or the like; namely, it is necessary to accurately ascertain a relationship between the power of the recording laser beam and the evaluation parameter. Such knowledge can be acquired at the test area where OPC is to be performed. The test area where OPC is to be performed and areas where actual data are recorded generally differ from each other in terms of recording sensitivity. Difficulty is encountered in accurately adjusting the power of the recording laser beam.

SUMMARY OF THE INVENTION

The present invention provides an optical disk drive which enables an increase in the speed of data recording or ensures recording quality by means of adjusting the power of a recording laser beam without regard to a short data length of a next-generation optical disk.

The present invention provides an optical disk drive for recording data for each predetermined recording block, wherein the recording block includes a user data area;
the optical disk drive includes
irradiation means for radiating a recording laser beam; and
a controller which radiates the recording laser beam in a predetermined area other than the user data area of the recording block, to thus tentatively write test data having a predetermined length, and which adjusts the power of the recording laser beam according to the amount of light reflected achieved during a period of tentative writing; and
the power of the recording laser beam is repeatedly adjusted for each predetermined recording block during data recording.

According to the present invention, ROPC is performed in a predetermined area other than a user data area in a recording block, so that recording quality can be ensured by means of guaranteeing performance of ROPC. Particularly, as a result of use of a remaining area in an APC area and use of test data which are longer than a specified length of data to be recorded, an increase in recording speed can also be addressed.

Moreover, the present invention provides an optical disk drive for recording data for each predetermined recording block, wherein the recording block includes a user data area;
the optical disk drive includes
irradiation means for radiating a recording laser beam; and
a controller for adjusting recording power by means of interrupting data recording during recording of data; and
the controller tentatively writes test data by means of changing power in a predetermined area other than the user data area of the recording block when data recording is interrupted, and adjusts the power of the laser beam according to a relationship between the quality of a signal acquired by reproduction of the tentatively-written test data and power.

According to the present invention, data recording is interrupted during recording of data, thereby enabling highly-accurate adjustment of recording power.

The invention will be more clearly comprehended by reference to the embodiment provided below. However, the scope of the invention is not limited to the embodiment.

BRIEF DESCRIPTION OF THE DRAWINGS

A preferred embodiment of the present invention will be described in detail by reference to the following figures, wherein.

DETAILED DESCRIPTION OF THE PREFERRED EMBODIMENT

An embodiment of the present invention will be described hereinbelow by reference to the drawings.

Figure 1:
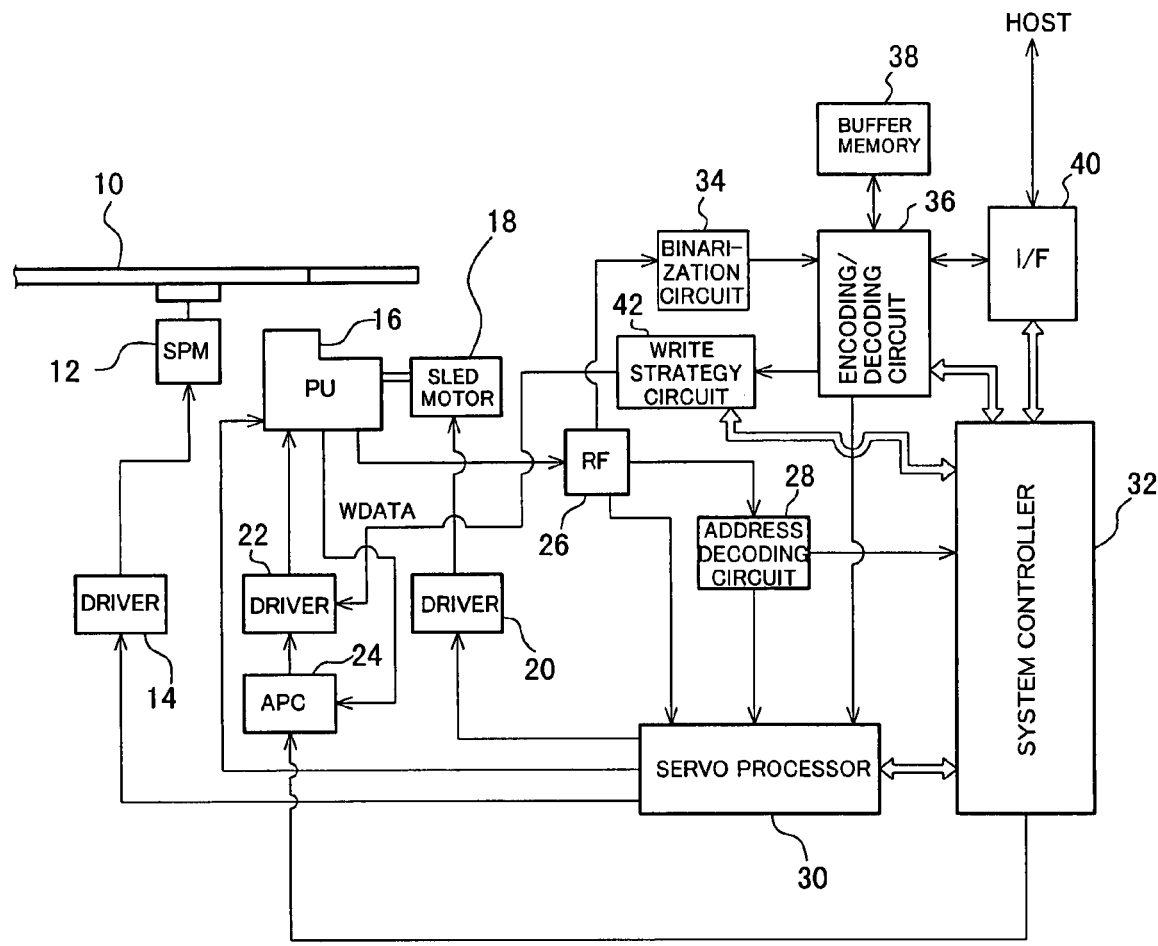
FIG. 1 is an overall block diagram of an optical disk drive of an embodiment.

FIG. 1 shows a block diagram of an overall optical disk drive according to an embodiment of the present invention. A spindle motor (SPM) 12 rotationally drives an optical disk 10 which enables recording of data, such as a DVD, a next-generation optical disk (blu-ray), or the like. The spindle motor SPM 12 is driven by a driver 14, and the driver 14 is servo-controlled by a servo processor 30 in such a way that a desired rotational speed is achieved.

An optical pickup 16 includes a laser diode (LD) which irradiates the optical disk 10 with a laser beam, and a photodetector (PD) which receives the light reflected by the optical disk 10 and converts the thus-received light into an electrical signal. The optical pickup 16 is disposed opposite the optical disk 10. The optical pickup 16 is actuated by a sled motor 18 in the radial direction of the optical disk 10, and the sled motor 18 is driven by a driver 20. The driver 20 is servo-controlled by the servo processor 30, as is the driver 14. Moreover, a driver 22 drives the LD of the optical pickup 16, and the driver 22 controls the quantity of light emitted by the LD pursuant to a command from a system controller 32. Although in the drawing the driver 22 is provided separately from the optical pickup 16, the driver 22 may also be incorporated into the optical pickup 16, as will be described later.

When the data recorded on the optical disk 10 are reproduced, a laser beam of reproducing power is emitted from the LD of the optical pickup 16; the light reflected by the optical disk 10 is converted into an electric signal by means of the PD; and the thus-converted electric signal is supplied to an RF circuit 26. The RF circuit 26 generates a focus error signal and a tracking error signal from the reproduced signal, and supplies the servo processor 30 with the thus-generated signals. In accordance with these error signals, the servo processor 30 servo-controls the optical pickup 16, thereby maintaining the optical pickup 16 in an on-focus state and an on-track state. The RF circuit 26 supplies an address decode circuit 28 with an address signal included in the reproduced signal. The address decode circuit 28 demodulates from the address signal address data pertaining to the optical disk 10, and supplies the servo processor 30 and the system controller 32 with the thus-demodulated address data.

One example of the address signal is a wobble signal. A track of the optical disk 10 is wobbled by means of a modulated signal of time information which shows the absolute address of the optical disk 10. The resultant wobble signal is extracted from the reproduced signal, and the thus-extracted wobble signal is decoded, so that address data (ATIP) can be acquired. The RF circuit 26 supplies the thus-reproduced RF signal to a binarization circuit 34. The binarization circuit 34 binarizes the reproduced RF signal, and feeds a resultantly-acquired signal to an encoder/decoder circuit 36. The encoder/decodet circuit 36 demodulates the binarized signal; corrects errors in the demodulated signal, to thus acquire reproduced data; and outputs the reproduced data to a host, such as a personal computer, by way of an interface I/F 40. When the reproduced data are output to the host, the encoder/decoder circuit 36 outputs the reproduced data after having temporarily stored the data in buffer memory 38.

When data are recorded in the optical disk 10, the data to be recorded, which are sent from the host, are supplied to the encoder/decoder circuit 36 by way of the interface I/F 40. The encoder/decoder circuit 36 stores, in the buffer memory 38, the data to be recorded; encodes the data to be recorded; and feeds the thus-encoded data to a write strategy circuit 42. The write strategy circuit 42 converts the modulated data into a multipulse signal (a pulse train) in accordance with a predetermined recording strategy; and supplies, as record data, the multipulse signal to the driver 22. Since the recording strategy affects recording quality, the recording strategy is usually fixed to a certain optimum strategy. The laser beam whose power has been modulated by the record data is emitted from the LD of the optical pickup 16, whereby the data are recorded in the optical disk 10. After recording of the data, the optical pickup 16 emits a laser beam of reproducing power, to thus reproduce the recorded data; and supplies the RF circuit 26 with the reproduced data. The RF circuit 26 supplies the binarization circuit 34 with the reproduced signal, and supplies the binarized data to the encoder/decoder circuit 36. The encoder/decoder circuit 36 decodes the modulated data, and verifies the thus-decoded data against the record data stored in the buffer memory 38. A result of verification is supplied to the system controller 32. In accordance with the result of verification, the system controller 32 determines whether to successively record data or to perform switching operation.

The system controller 32 controls operation of the entire system; particularly, performs OPC and ROPC. By means of OPC, test data are tentatively written in the test area of the optical disk 10 by means of changing the recording power stepwise; the tentatively-written test data are reproduced; and a β value, a γ value, the degree of modulation, an error rate, and the like, of the reproduced data are measured. Recording power—at which the quality of the reproduced signal, such as an error rate and the like, comes to a desired value—is selected and taken as optimum recording power Po. The system controller 32 controls the driver 22 such that selected recording power Po is achieved. The system controller 32 also performs ROPC. By means of ROPC, the value of the level B achieved when a pit is formed by means of the recording laser beam as mentioned above is sampled, and the driver 22 is controlled in accordance with the thus-acquired value of level B, thereby increasing or decreasing the recording power.

ROPC processing to be performed by the system controller 32 is described hereinbelow by means of taking a blu-ray as an example of the optical disk 10.

Figure 8:
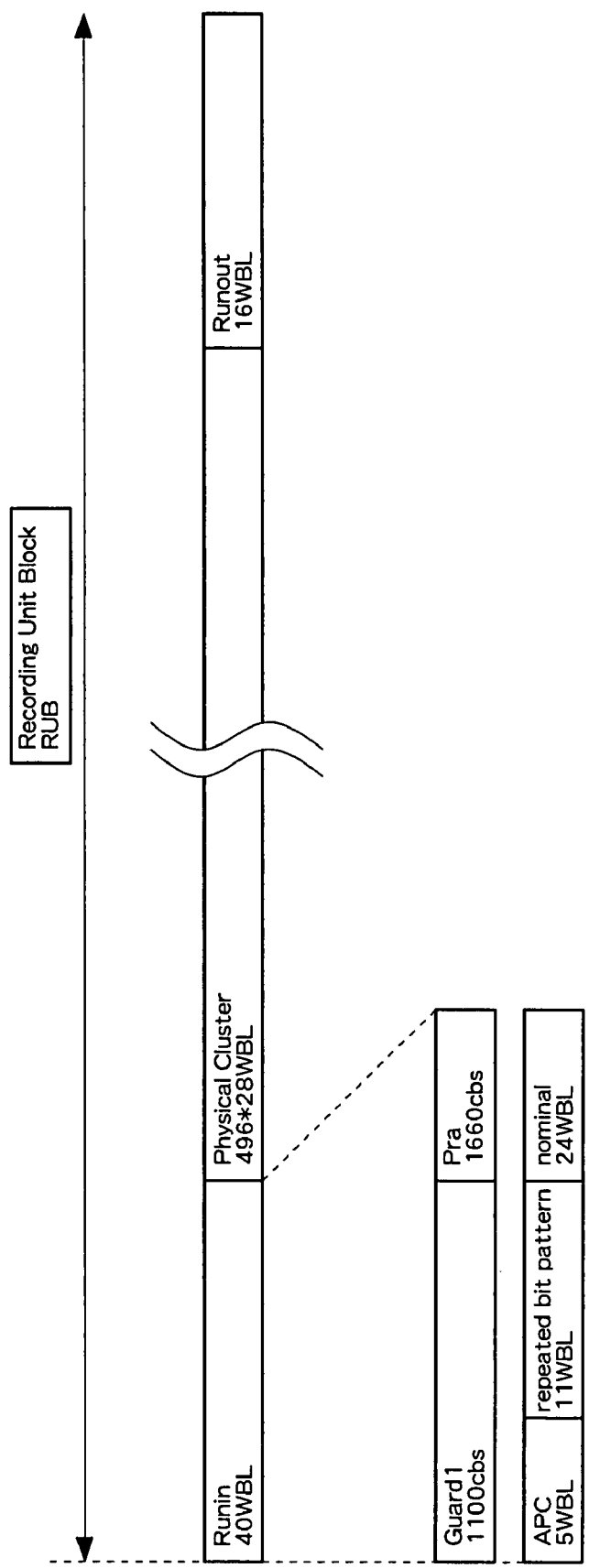
FIG. 8 is a descriptive view of a data structure of a blu-ray disk.

FIG. 8 shows the data structure of the blu-ray. Data are managed on a per-recording-unit-block (RUB) basis. A single RUB comprises a run-in section (Runin section) of 2760 channel bits (cbs); a physical cluster (Physical Cluster) of 496×1932 channel bits; and a run-out section (Runout section) of 1104 channel bits. The physical cluster is a user data area. Of the run-in section, the physical cluster, and the run-out section, a top run-in section is provided with an APC area. This APC area corresponds to five wobbles (i.e., 5×69 channel bits), and APC is performed through use of this area. Here, the term "APC" signifies that a drive current at which a desired quantity of light emission can be acquired is adjusted by means of computing a relationship between an electric current (i) and the quantity of light emission (L), because a light-emission characteristic of the laser diode (LD) exhibits temperature dependence and the quantity of light emission can change even at the same drive current. By use of the APC area, there is performed processing for detecting the quantity of light emission by means of changing a drive current in various manners; computing a relationship between the electric current and the quantity of light emission; and computing a drive current at which a desired quantity of light emission is achieved. For instance, an LD is driven at 5 mW and 15 mW, and the quantity of light emission achieved at this time is detected by means of a light-receiving element (front monitor) located in the vicinity of the LD; and an i-L characteristic of the LD is learned or corrected. Although the APC area corresponding to five wobbles has already been ensured as mentioned above, the size of the APC area corresponding to five wobbles is not required for actually learning or correcting the i-L characteristic, and remaining portions of the APC area still remain unused.

In the present embodiment, attention is paid to the unused portions, and ROPC is performed by use of remaining portions, which are not used, in the APC area. For instance, among the five wobble periods of the APC area, two wobble periods are used for APC; the remaining three wobble periods are used for ROPC, and the like. In the blu-ray disk, only data having a data length of 2 T to 8 T (up to a data length of 9 T when a sync signal is included) appear. However, since arbitrary test data can be tentatively written in the APC area, test data having a data length longer than 9 T; e.g., test data having a data length of 50 T, or the like, are tentatively written when ROPC is performed, thereby detecting the level B.

Figure 2:
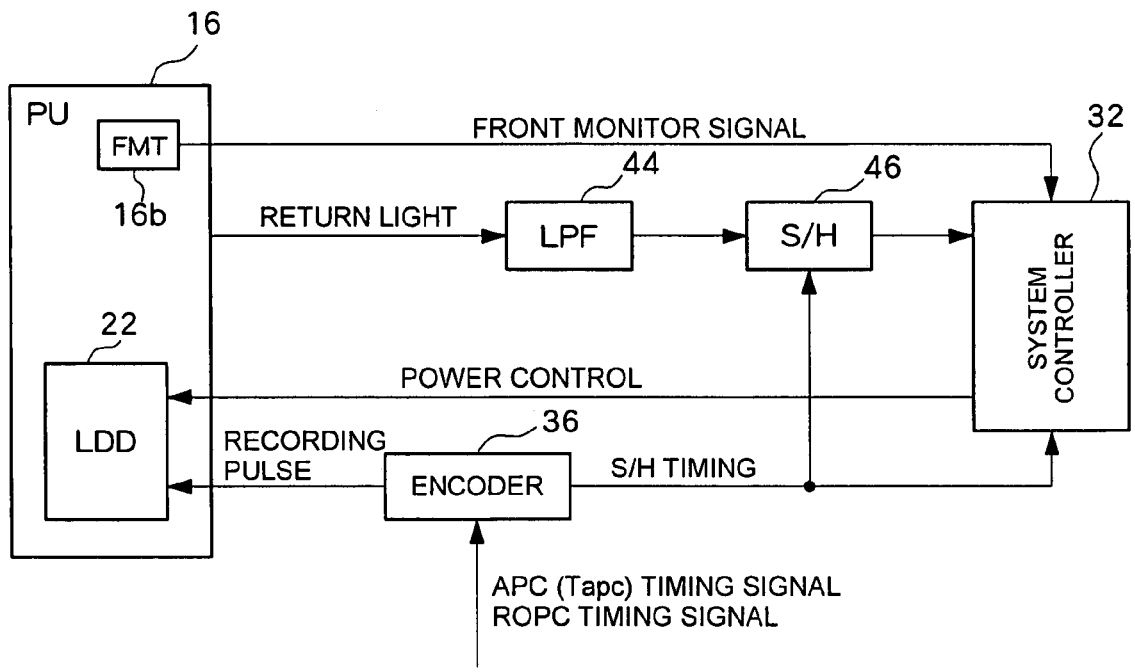
FIG. 2 is a block diagram of the principal section of the optical disk drive.

FIG. 2 shows the configuration of the principal section, which performs APC and ROPC in the APC area of a recording unit block RUB. In addition to including the LD, a quadrant photodetector PD, an objective lens, an objective lens drive circuit (a drive circuit for effecting driving action in a focusing direction as well as in a tracking direction), and the like, the optical pickup 16 has the driver (LDD) 22 for driving the LD and a front monitor (FMT) 16b which detects the quantity of light emitted by the LD located in the vicinity of the LD. The front monitor 16b converts the quantity of light emitted by the LD into an electric signal and outputs the electric signal to the system controller 32.

The quadrant photodetector detects the quantity of light reflected by the optical disk 10 (the amount of return light) of the laser beam emitted from the LD, and supplies a low-pass filer LPF 44 with the detected quantity of reflected light.

The low-pass filter 44 eliminates, as noise, high-frequency components included in the reflected light signal; and supplies the noise-removed reflected light signal to the sample hold circuit S/H 46. The high-frequency components include, for instance, modulation components ascribable to the recording strategy adopted during recording of data. In the present embodiment, test data having a long data length of 50 T, or the like, are subjected to sample holding, and hence the cutoff frequency fc of the low-pass filter 44 does not need to be set to a high level. The sample hold circuit S/H 46 subjects the signal from the low-pass filter 44 to sample holding, to thus detect the level B of the quantity of reflected light; and supplies the thus-detected level B to the system controller 32. Sample hold timing of the sample hold circuit S/H 46 is given by the encoder/decoder circuit 36. The encoder/decoder circuit 36 receives from a formatter or a timing generator, as an input, a timing control signal Tapc showing an APC area of the recording unit block RUB; and from this signal determines the start timing of the APC area. The encoder/decoder circuit 36 supplies the system controller 32 with a timing signal by means of which APC is performed in two wobble periods; and supplies the system controller 32 and the sample hold circuit S/H 46 with an end timing signal of the two wobble periods; i.e., an ROPC start timing signal. In accordance with the ROPC start timing signal from the encoder 36, the sample hold circuit S/H 46 subjects the quantity of reflected light to sample holding, to thus detect a level B. As mentioned previously, the level B is a value achieved at a timing when a pit has been formed and the quantity of reflected light has become stable; and is defined as a timing achieved after lapse of a predetermined period of time since the start timing of ROPC.

Figure 3:
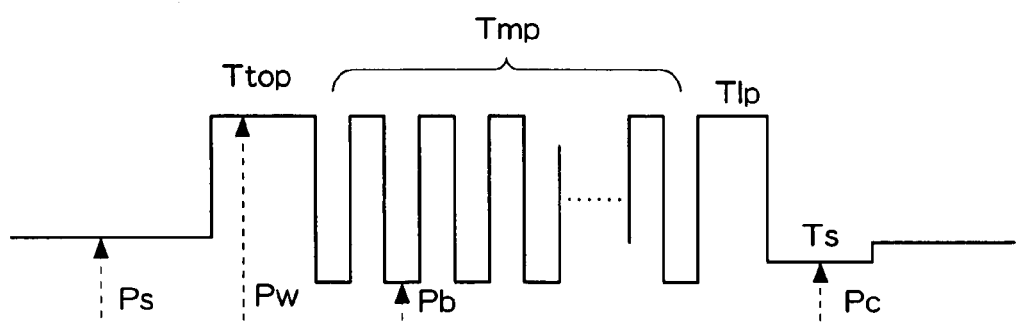
FIG. 3 is a descriptive view of a recording strategy.

In accordance with a timing signal output from the formatter or the timing generator, the encoder/decoder circuit 36 supplies the driver 22 with a recording pulse signal in order to perform APC and ROPC in the APC area. Further, the driver 22 is supplied with the recording pulse signal complying with a predetermined recording strategy with a view toward recording user data in a physical cluster. FIG. 3 shows an example recording strategy used at the time of recording of user data. The recording strategy comprises a top pulse Ttop, a subsequent multipulse Tmp, and a last pulse Tlp. The recording strategy varies in various manners according to the pulse width and pulse level (Pw) of the top pulse Ttop, the number and pulse level of multipulses (Pb), the pulse width and pulse level (Pw) of a last pulse Tlp, and the pulse width (Ts) and pulse level (Pc) of a pulse achieved after the last pulse Tlp. Although the top pulse Ttop, the multipulses Tmp, and the last pulse Tlp are superimposed on a bias level Ps, the bias level Ps is set to a reproduction level or an erasure level. When the length of data to be recorded is 2 T, only the top pulse Ttop is present, and the multipulses Tmp and the last pulse Tlp are not present. When the length of data to be recorded is 3 T, the top pulse Ttop and the last pulse Tlp are present, but the multipulses Tmp are not present.

When the length of data to be recorded is nT ("n" is four or more), all of the top pulse Ttop, the multipulses Tmp, and the last pulse Tlp are present, and the recording strategy is determined as Ttop+(n−3)×Tmp+Tlp.

The recording strategy may be fixed, or may be optimized when OPC is performed.

When actual data should be recorded, operation complies with the above recording strategy. However, when APC is performed, the essential requirement is to drive the driver 22 by means of a single pulse signal. Moreover, when ROPC is performed, an arbitrary strategy can be used, because test data are tentatively written. In the present embodiment, the encoder/decoder circuit 36 tentatively writes test data by means of adopting the recording strategy, which is to be used during recording of actual data, to thus perform ROPC. Thus, the effectiveness of ROPC is ensured without fail. Specifically, in order to record test data having a length of 50T, the test data are tentatively written by means of a recording strategy that is defined as Ttop+47×Tmp+Tlp in compliance with the above expression.

In response to a timing signal from the encoder/decoder circuit 36, the system controller 32 controls the driver 22 with a view toward performing APC and ROPC in the APC area. In ROPC, the following processing is performed. Specifically, first, OPC is performed in a blu-ray test area, to thus set optimum recording power Po, and test data having a length of 50 T are tentatively written at the set optimum recording power Po. The level B of the quantity of reflected light acquired at that time (taken as Bo) is detected and stored in memory. The thus-acquired recording power Po and the value Bo of the level B form a combination under ideal recording conditions. During recording of actual data, the value of the level B is sampled, and recording power P is adjusted such that $Bo/Po''=B/P''$ becomes constant. Recording power P may also be adjusted through use of the thus-acquired Po, Bo, and B and by means of another method. For instance, $B/P''$ is computed from current recording power P and the acquired level B, and the thus-computed $B/P''$ is compared with $Bo/Po''$. The current recording power P may also be increased or decreased by a given amount (e.g., ±0.2 mW) in accordance with the result of comparison.

Figure 4:
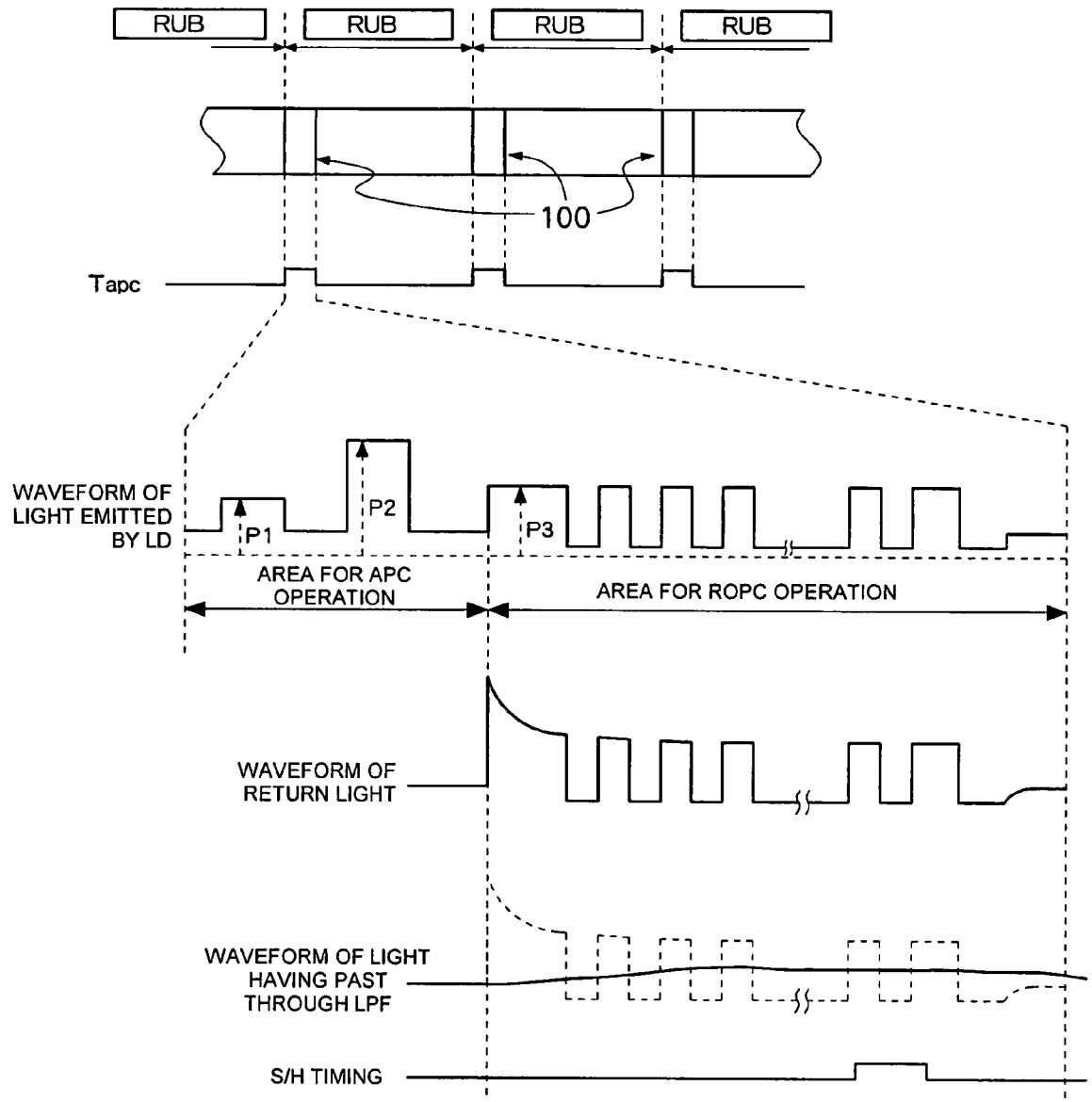
FIG. 4 is a chart of timings at which APC and ROPC are performed.

FIG. 4 shows timings at which APC and ROPC are to be performed in the APC area. An APC area 100 is present at the top of the recording unit block RUB, and the APC area 100 is divided into two areas; namely, an area for APC operation (hereinafter called an "APC operation area") and an area for ROPC operation (hereinafter called an "ROPC operation area"). In the APC operation area, the LD is driven by means of two power sources P1 and P2, as illustrated. The quantity of light emitted at that time is detected by means of the front monitor 16b, to thus acquire an i-L characteristic. A drive current at which a desired quantity of light emission is achieved is computed from the thus-acquired i-L characteristic, and the LD is driven by means of the thus-computed drive current. The i-L characteristic of the LD fluctuates under the influence of temperature. Consequently, there is a necessity of performing APC on a per-RUB basis, to thus correct or calibrate the i-L characteristic at all times. As mentioned above, the test data having a length of 50 T are recorded in the ROPC operation area, and the quantity of light reflected during tentative writing of the test data is subjected to sample holding, to thus detect a level B. As a result of adoption of the test data having a length of 50 T, the reflected light signal passes through the low-pass filter 44 having a sufficiently low frequency band, whereby noise can be sufficiently eliminated from the multipulse signal. For instance, in the case of a channel bit rate of 66 MHz, 50 T corresponds to 0.76 μs, and hence the cutoff frequency fc of the low-pass filter 44 can be lowered to a value as low as 1.32 MHz. The drawing shows the waveform of reflected light (the waveform of return light), the waveform of light having passed through the low-pass filter 44, and a sample hold timing waveform of the sample hold circuit S/H 46. Although modulation components of the recording strategy are superimposed on the waveform of reflected light, the modulation components are understood to have been eliminated by means of the low-pass filter 44.

As mentioned above, ROPC is performed in the APC area that appears at a predetermined frequency, and data are recorded while the recording power is being increased or decreased. As illustrated, during performance of ROPC, the level B may also be detected by means of tentatively writing the test data having a length of 50 T only once. However, when the APC area 100 corresponds to five wobble periods and three wobble periods are assigned to ROPC, 3×69=207 channel bits can be ensured. Hence, the test data having a length of 50 T can be tentatively written four times rather than only once. Accordingly, as in a case where recording power is changed stepwise when OPC is performed in a predetermined test area, the test data having a length of 50 T may also be tentatively written while the recording power is being changed in a plurality of steps, to thus perform ROPC.

Figure 5:
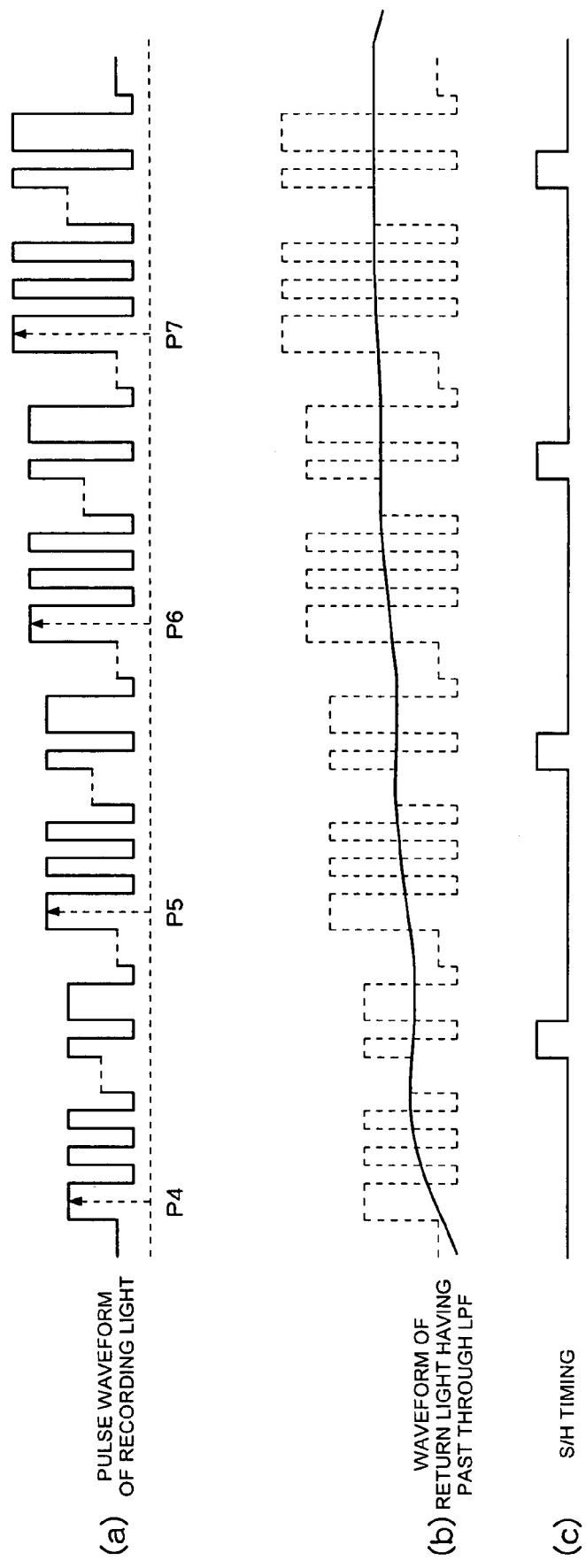
FIGS. 5A to 5C are charts of timings at which ROPC is performed.
Figure 6:
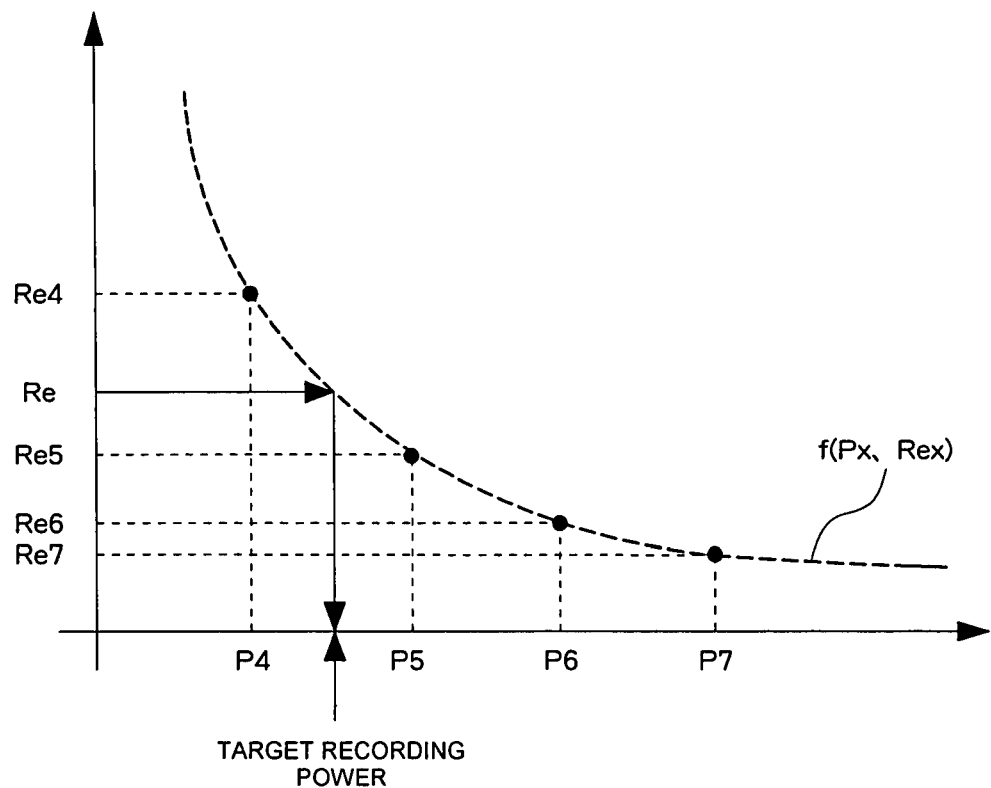
FIG. 6 is a graph showing a relationship between recording power and reflectance.

FIGS. 5A to 5C show timing charts acquired when the test data having a length of 50 T are written tentatively by means of changing recording power in sequence of P4, P5, P6, and P7. FIG. 5A shows the waveform of a recording pulse signal, wherein a recording strategy used for tentatively writing the test data of 50 T appears four times repeatedly. FIG. 5B shows the waveform of light reflected at that time (return light), wherein the waveform of the signal having passed through the low-pass filter 44 is designated by a solid line in the drawing. FIG. 5C shows a sample hold timing of the sample hold circuit S/H 46. A total of four sets, each consisting of recording power and the value of the level B, are acquired by means of performing a total of four times processing for tentatively writing the test data of 50 T and subjecting reflected light to sample holding. These sets are taken as (P4, B4), (P5, B5), (P6, B6), and (P7, B7). With a view toward performing ROPC by use of these combinations, reflectance R=B/P is computed. Specifically, R4=B4/P4, R5=B5/P5, R6=B6/P6, and R7=B7/P7 are determined through computation. Moreover, a relational expression between the reflectance R and the recording power is computed. FIG. 6 shows a relationship between the recording power P and the reflectance R. The system controller 32 computes f (Px, Rx) from the relationship between the recording power P and the reflectance R. Ideal reflectance Ro is computed from an ideal relationship (Po, Bo) acquired during performance of OPC. This ideal reflectance Ro is substituted into the relational expression f(Px, Rx), so that recording power ideal for the position where ROPC is to be performed can be acquired. ROPC processing is summarized as follows.

(1) OPC is performed in a test area of a blu-ray disk, and the test data of 50 T are tentatively written at optimum recording power Po, to thus detect a level B. A combination (Po, Bo), which is a combination of ideal recording power Po and the value Bo of the level B, is determined.

(2) Ideal reflectance Ro=Bo/Po is determined from (Po, Bo)

(3) After APC has been performed in the APC area, test data of 50 T are repeatedly written tentatively a plurality of times while the recording power is being changed in a plurality of steps, and a level B achieved each time is detected, thereby determining combinations of recording power P and the level B.

(4) Reflectance R is determined from the combination of recording power and the level B.

(5) A relational expression f(Px, Bx) between recording power and reflectance is computed.

(6) Recording power is computed from the ideal reflectance Ro and the relational expression "f," thereby increasing or decreasing current recording power.

In the present embodiment, since ROPC is performed repeatedly in the APC area, the recording power can be adjusted to an optimum value at all times. Further, ROPC is performed by use of test data having a length as long as 50 T, and hence an increase in recording speed can also be addressed.

In the present embodiment, among the five wobble periods, the two wobble periods are used for APC operation, and remaining three wobble periods are used for ROPC operation. However, settings can be made arbitrarily; for instance, three wobble periods are assigned to APC operation, and remaining two wobble periods are assigned to ROPC operation, and the like. A proportion of wobble periods for APC operation to wobble periods for ROPC operation may also be changed adaptively for each optical disk or for each radial position even in the case of a single optical disk. For instance, at an inner track three wobble periods are assigned to APC operation, and two wobble periods are assigned to ROPC operation. Meanwhile, at an outer track, two wobble periods are assigned to APC operation, and three wobble periods are assigned to ROPC operation. Since there is a chance of intact application, at an inner track, of optimum recording power Po set through OPC, five wobble periods may be assigned to APC at an inner track without involvement of ROPC operation. Generally, a necessity for ROPC increases with an increasing distance toward an outer track. Therefore, increasing the proportion of wobble periods for ROPC operation is preferable, with a view toward enhancing the performance accuracy of ROPC.

Figure 7:
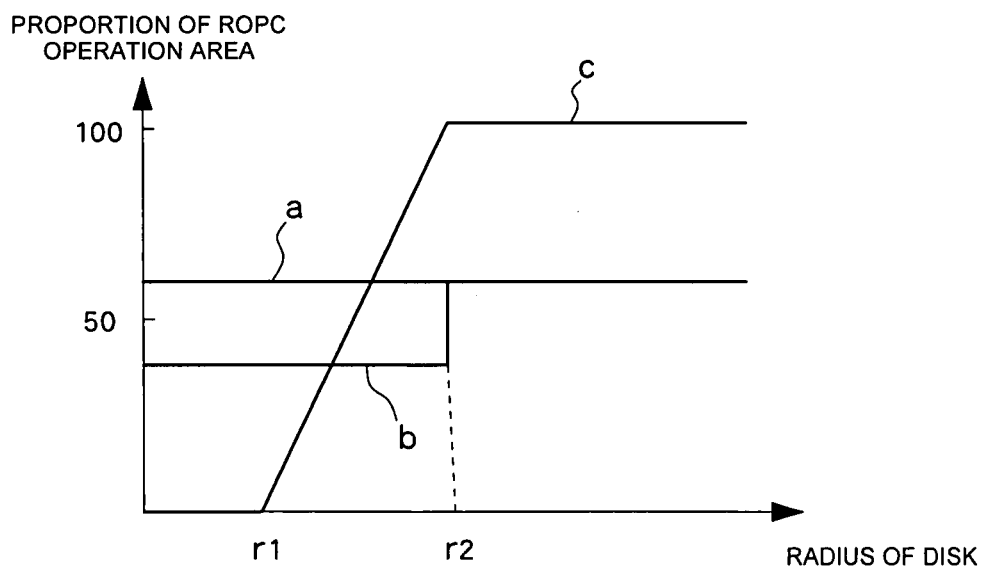
FIG. 7 is a graph showing a relationship between the radius of an optical disk and an ROPC proportion.

FIG. 7 shows examples of the proportion of the ROPC operation area to the APC area; namely, three cases. Proportion "a" shows a case where the proportion of the ROPC operation area is fixed to 60% (i.e., three wobble periods among the five wobble periods) without regard to a radius. Proportion "b" shows a case where the proportion of the ROPC operation area is 40% up to a certain radial position r2. The proportion increases to 60% at a greater radial position. Proportion "c" shows a case where the proportion of the ROPC operation area is 0% up to a certain radius r1, namely, only APC is performed without involvement of ROPC; where the proportion of the ROPC operation area sequentially increases with radial position within a range of r1 to r2; and where the proportion of the ROPC operation assumes a value of 100% at a radial position r2 or more; namely, when only ROPC is performed. Proportion "c" shows a case where APC and ROPC are performed by use of the APC area in at least some area rather than APC and ROPC being performed at all times in all of the areas of the optical disk 10.

In the present embodiment, recording power is increased or decreased by use of B/P or $B/P^2$ during performance of ROPC. However, $B/P^n$ ("n" is a real number of one or more) may also be used more generally, to thus increase or decrease recording power.

Figure 15:
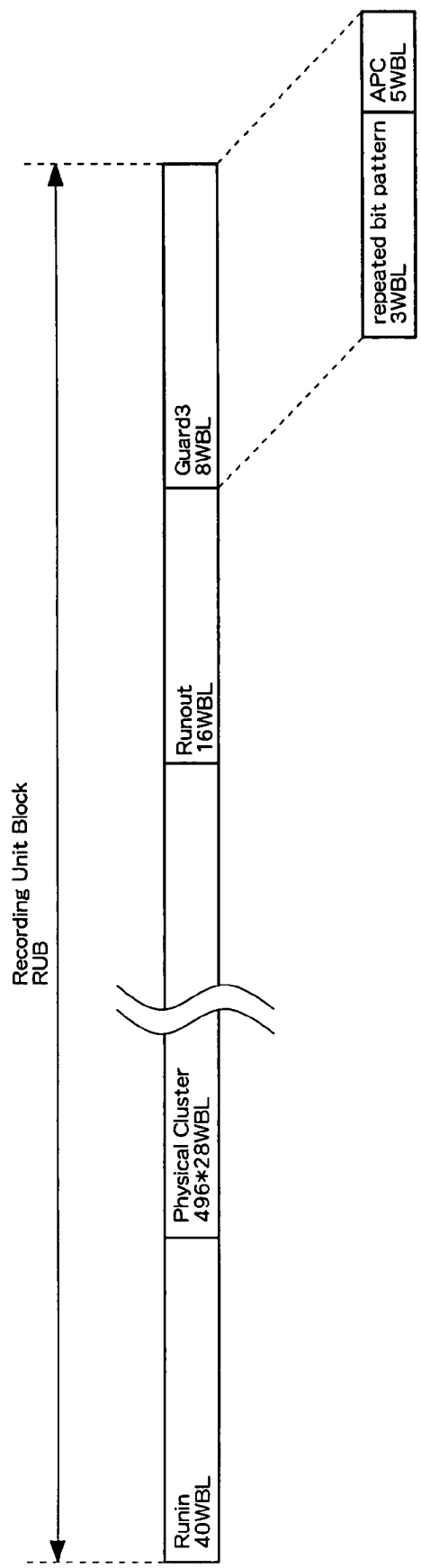
FIG. 15 is a descriptive view of another data structure of the blu-ray disk.

FIG. 15 again shows the data structure of the blu-ray disk. A guard area is provided with a predetermined iterative bit pattern area and an APC area. The guard area corresponds to eight wobble periods (8×69 channel bits). Of these periods, three wobble periods are assigned to this iterative bit pattern area. Remaining five wobble periods are assigned to the APC area. Although the five wobble periods are ensured for the APC area, the five wobble periods are not required for actual learning or correction of the i-L characteristic. Of the periods assigned to the APC area, remaining periods still remain unused. Moreover, since the APC area is also provided in the top run-in area of the RUB, the APC area in the guard area is not necessarily used. In this case, all of the five wobble periods still remain as unused areas.

In the present embodiment, as mentioned above, attention is paid to the APC area subsequent to the iterative bit pattern area in the guard area recorded during interruption of data recording. A relationship between recording power and an evaluation parameter, to which reference is to be made by means of the recalling method, is acquired by use of this APC area. Specifically, after interruption of data recording, the quality of the data recorded immediately before is evaluated, and the relationship between recording power and the evaluation parameter is computed by use of the APC area. Current recording power is increased or decreased by use of the quality of the data recorded immediately before and the computed relationship. The relationship between the recording power and the evaluation parameter is computed in the area where recording of the data has been interrupted rather than in the test area where OPC is performed. Therefore, recording power can be adjusted accurately.

Figure 9:
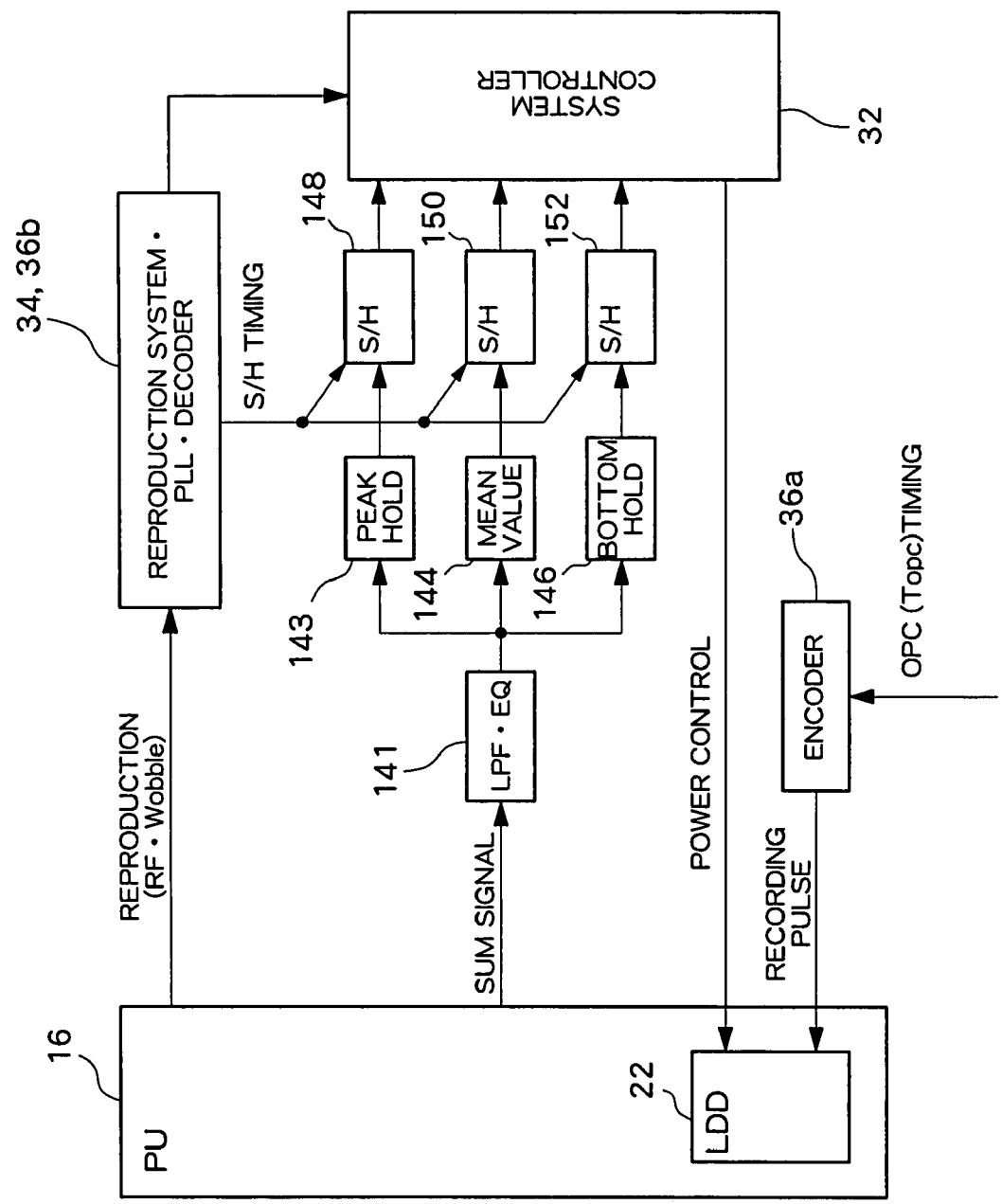
FIG. 9 is a block diagram of another principal section of the optical disk drive.

FIG. 9 shows the configuration of the principal section which adjusts recording power in the APC area included in the guard area of the recording unit block RUB. In addition to having the LD, the quadrant photodetector PD, the objective lens, the objective lens drive circuit (the drive circuit for effecting driving actions in a focusing direction as well as in a tracking direction), and the like, the optical pickup 16 has the driver (LDD) 22.

A difference signal (a difference signal between the inner track signal and the outer track signal) from the quadrant photodetector is supplied, as a reproduced signal and a wobble signal, to the reproduction system circuit (a binarization circuit) 34 including the PLL circuit as well as to the decoder 36b of the encoder/decoder circuit 36. A sum signal (a sum signal consisting of the inner track signal and the outer track signal) from the quadrant photodetector is supplied to a low-pass filter and equalizer 141. High-frequency noise is eliminated from the sum signal, and a predetermined frequency component of the signal is boosted and leveled. Subsequently, the sum signal is supplied to a peak hold circuit 143, a mean value circuit 144, and a bottom hold circuit 146.

The peak hold circuit 143 detects the peak level of the sum signal, and outputs the thus-detected peak level to a sample hold circuit (S/H) 148. The mean value circuit 144 detects a mean value of the sum signal, and outputs the thus-detected value to a sample hold circuit 150. The bottom hold circuit 146 detects the bottom level of the sum signal, and outputs the detected bottom level to a sample hold circuit 152.

The sample hold circuit 148 detects a peak level; the sample hold circuit 150 detects a mean-value level; and the sample hold circuit 152 detects a bottom level. The thus-sample-held levels are supplied to the system controller 32. Sampling timings of the sample hold circuits 148, 150, and 152 are determined from the clock signals acquired by the PLL circuit of the reproduction system circuit 34.

In accordance with an OPC timing signal from the formatter or the timing generator, the encoder 36a of the encoder/decoder circuit 36 receives a timing signal Topc showing an APC area subsequent to an iterative bit pattern area of the guard area (Guard 3) to be recorded after interruption of data recording. In order to compute the relationship between recording power and an evaluation parameter, a recording pulse signal whose recording power changes stepwise is generated and supplied to the driver 22. In accordance with the recording pulse signal, the driver 22 tentatively writes the test data in the APC area of the guard area. A reproduced signal of the thus-tentatively-written test data is supplied to the reproduction system circuit 34 and the decoder 36b, where the signal is demodulated; and the demodulated signal is supplied to the system controller 32. The system controller 32 evaluates the demodulated data, thereby computing a relationship between recording power and the evaluation parameter. For instance, β values of the test data tentatively written at the respective recording power levels are evaluated, to thus compute a relationship between recording power and the β value. Through use of the β value of the data recorded immediately before and the relationship between recording power and the β value, recording power—by means of which a target β value to be originally acquired is gained—is computed, thereby increasing or decreasing recording power. Specifically, the system controller 32 adjusts the recording power according to the procedures provided below.

(1) Prior to data recording, OPC is performed in the test area (PCA) of the optical disk 10, and the optimum recording power Po is set.
(2) Data are recorded at the optimum recording power Po.
(3) Data recording is interrupted when data are recorded up to a predetermined recording length, when data are recorded for only a predetermined time, when a predetermined level of increase in temperature is detected, or when under-run of the buffer has arisen.
(4) The iterative bit pattern is recorded in the guard area, and recording power is changed stepwise in the APC area of the guard area, thereby tentatively writing test data.
(5) After completion of tentative writing of the data, an arbitrary portion of the data acquired immediately before interruption of recording operation is reproduced, and the quality of the thus-reproduced data portion (e.g., a β value) is evaluated.
(6) The tentatively-written test data are reproduced, and the quality of the reproduced data is evaluated, thereby computing the relationship between recording power and the evaluation parameter.
(7) According to the result of computation performed in (6) or a relationship existing between (5) and (6), current recording power is adjusted.

Figure 10:
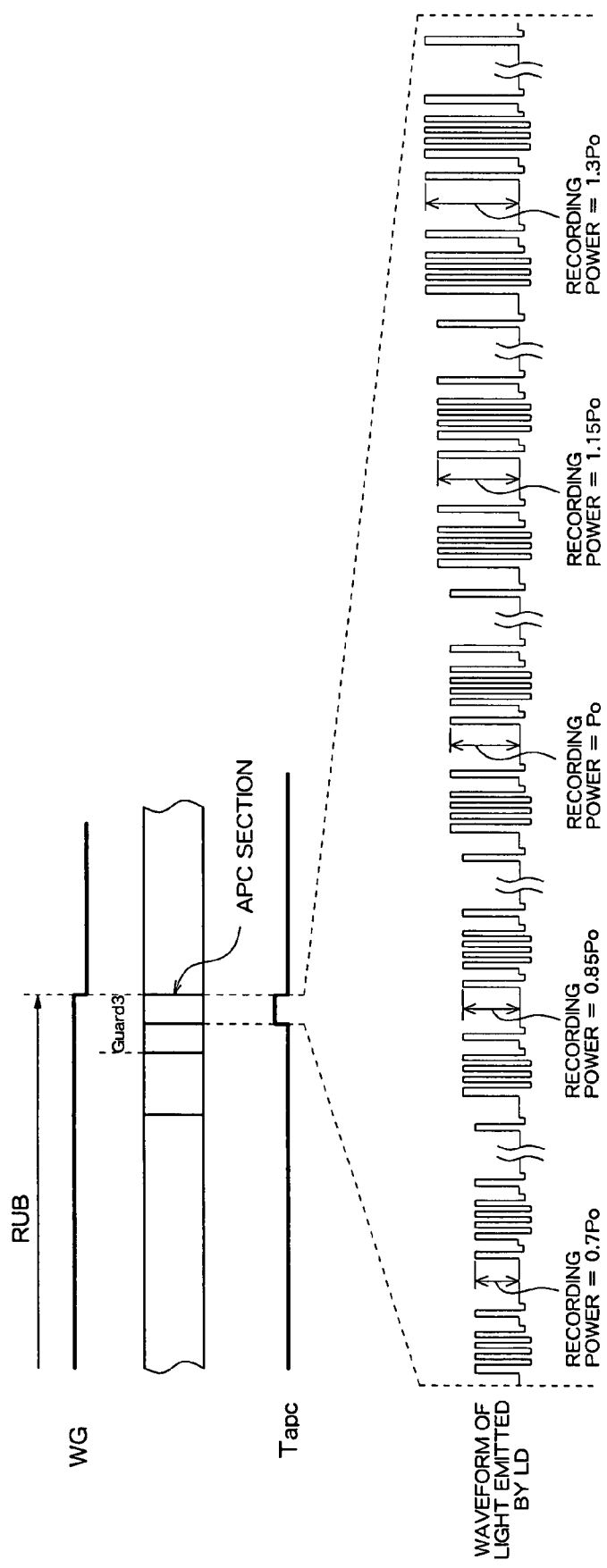
FIG. 10 is a descriptive view of a recording pulse signal by means of which test data are tentatively written.

FIG. 10 shows a recording pulse signal (or the pattern of light emitted by the LD) used for tentatively writing test data in the APC area of the guard area (Guard 3) to be recorded after interruption of recording operation. In FIG. 10, recording power is changed in five steps: power (0.7 Po) which is decreased by 30% with reference to the current recording power Po; power (0.85 Po) which is decreased by 15% with reference to the current recording power Po; power (1.15 Po) which is increased by 15% with reference to the current recording power Po; and power (1.3 Po) which is increased by 30% with reference to the current recording power Po. One power level is assigned to one wobble period among the five wobble periods, and test data are tentatively written. In the first wobble period, recording power is 0.7 Po. In the second wobble period, recording power is 0.85 Po, and the like. The test data may be random or have a predetermined length. In the drawing, there is an iterative pattern of data having the shortest length and data having the largest length.

FIGS. 11A to 11D shows waveforms of the reproduced signal acquired when the test data shown in FIG. 10 have been tentatively written. FIG. 11A shows the waveform of a sum signal of the test data; FIG. 11B shows a waveform acquired as a result of the peak hold circuit 43 having detected the peak of the waveform of the sum signal; FIG. 11C shows a waveform acquired as a result of the mean value circuit 44 having detected a mean value of the waveform of the sum signal; and FIG. 11D shows a waveform acquired as a result of the bottom hold circuit 46 having detected the bottom of the waveform of the sum signal. The β value of the reproduced signal is defined as $\beta=(A-B)/(A+B)$, provided that the peak level of an RC-coupled reproduced signal is taken as A and the bottom level of the same is taken as B. By use of these values, the system controller 32 computes a β value for each recording power and stores the thus-computed β value into memory. The decoder 36b transmits the timing (the reproduction timing of test data) to the system controller 32, and the system controller 32 computes a β value for each recording power in accordance with the timing signal.

Figure 12:
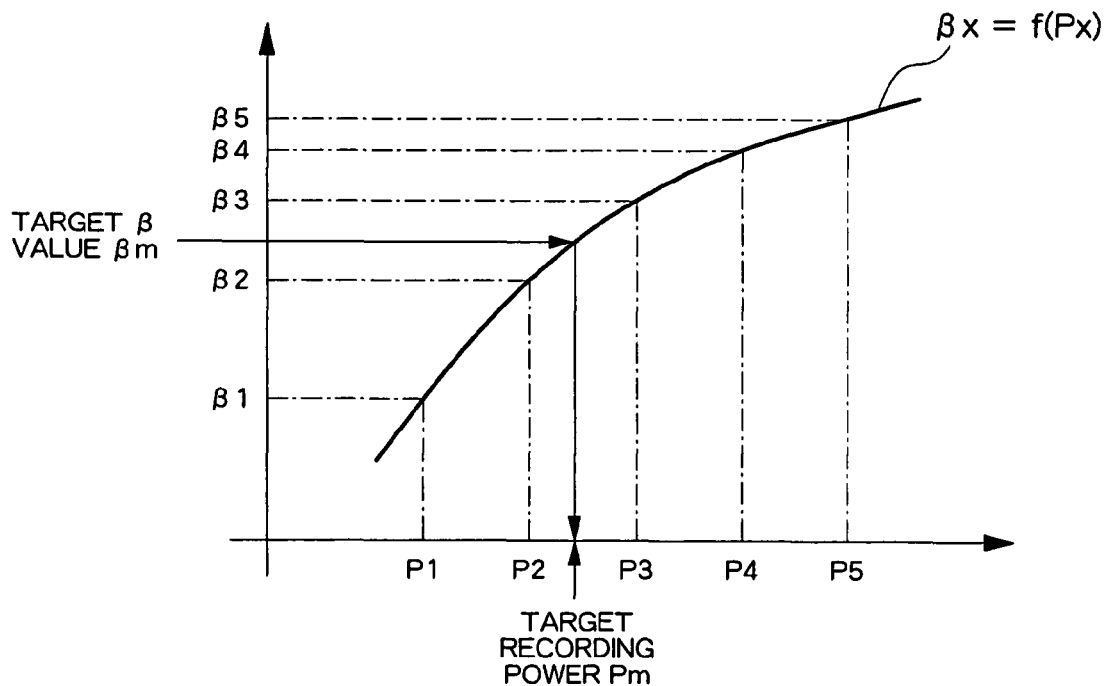
FIG. 12 is a graph showing a relationship between power and a β value.

FIG. 12 shows a drawing, wherein β values (which are taken as β1 to β5) computed for the respective power levels (which are taken as P1 to P5) changed in five steps are plotted. The system controller 32 computes a relational expression $\beta=f(P)$ by use of these sets of (P, β). βm, which is a target, β value, is substituted into the relational expression, thereby computing target recording power Pm and increasing or decreasing the current recording power.

Figure 13:
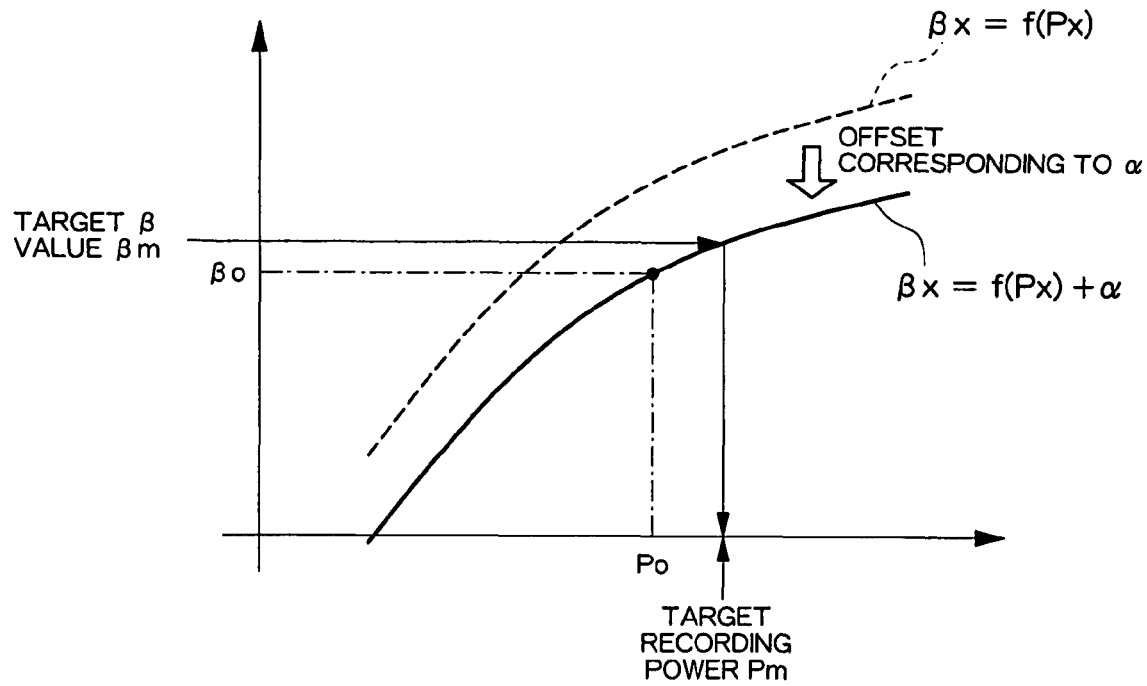
FIG. 13 is another graph showing a relationship between power and the β value.

Meanwhile, detection of β1 to β5 shown in FIG. 12 is performed within a short period of time. Hence, an offset may arise, depending on a time constant of the detection circuit, such as the peak hold circuit 43 or the like. Accordingly, as shown in FIG. 13, the system controller 32 sets $\beta=f(P)+\alpha$ (α is a constant) on the assumption that an offset has arisen in the relational expression $\beta=f(P)$; and substitutes into the thus-set expression sets of (P, β) acquired by means of reproduction of the data recorded immediately before recording operation, to thus compute α. As a result of βm—which is a target β value—being substituted into the relational expression, target recording power Pm is computed, to thus increase or decrease the current recording power. As a matter of course, the β value is an example evaluation parameter. In general, when the evaluation parameter is taken as Q, the essential requirement is to define $Q=f(P)+\alpha$ as the relationship between recording power and the evaluation parameter, as well as to determine the offset α from the evaluation parameter Qo of the data acquired immediately before interruption of recording of the data and power Po.

The system controller 32 may also adjust the recording power by another method. For instance, there may arise a case where an abrupt change in recording power results in occurrence of an error during reproduction. Therefore, recording power may also be set, by use of a certain coefficient "k," between recording power Po achieved immediately before interruption of data recording and the recording power Pm computed by the above method. Specifically, recording power is set by means of $P=Po+k(Pm-Po)Po$.

As mentioned above, in the present embodiment, a relationship between the recording power achieved in the area— where interruption has arisen—and the evaluation parameter (a β value, or the like) is computed at the time of interruption of data recording. Recording power is adjusted according to the relationship, and hence the accuracy of adjustment of recording power is enhanced. Further, the guard area previously ensured at the time of interruption of data recording is employed as an area to be used for computing the relationship between recording power and the evaluation parameter. Hence, a decrease in the recording capacity of the optical disk 10 is not entailed, as well.

Although the embodiment of the present invention has been described above, the present invention is not limited to the embodiment and is susceptible to other forms.

Figure 11:
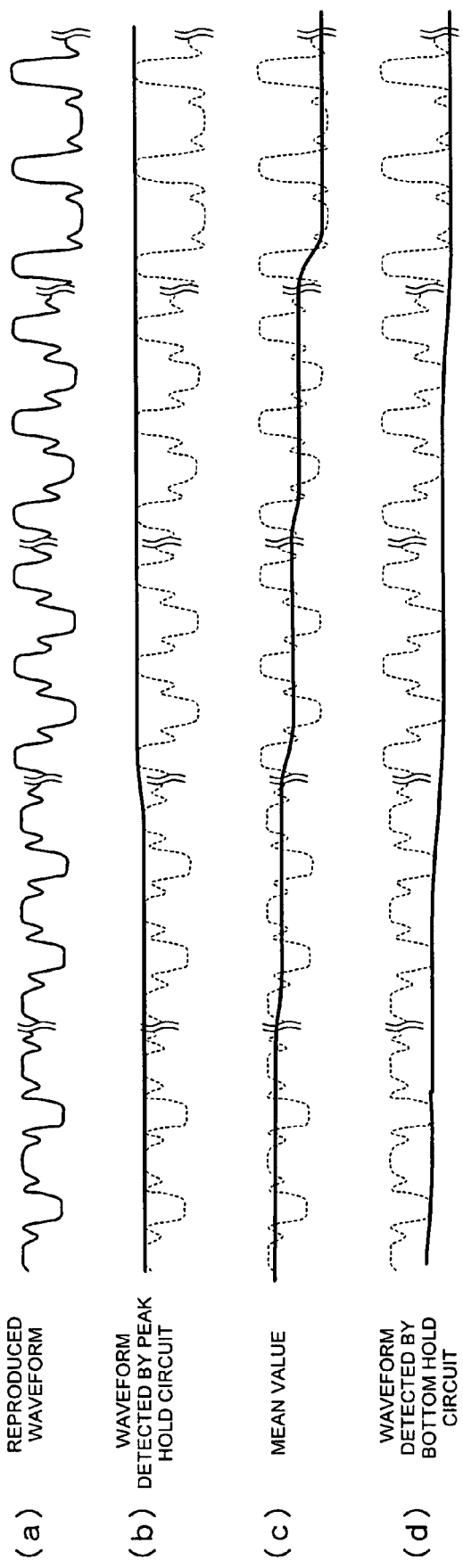
FIGS. 11A to 11D are charts pertaining to timings of a waveform of a reproduced signal (the waveform of a sum signal) and timings of a detection waveform.
Figure 14:
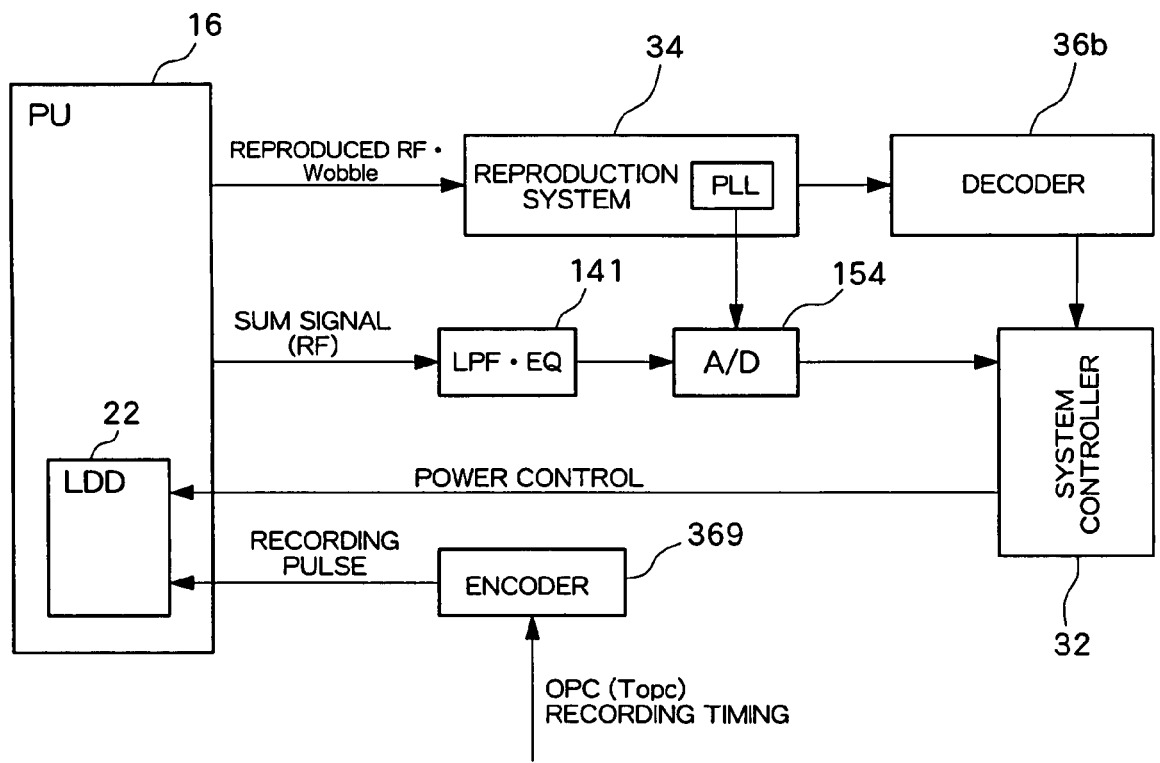
FIG. 14 is a graph of yet another principal section of the optical disk drive.

For instance, in the present embodiment, as shown in FIGS. 9 and 11 an analogue detection circuit, such as the peak hold circuit 143 or the like, detects the sum signal, and supplies the thus-detected sum signal to the system controller 32. However, as shown in FIG. 14, an A/D converter 154 may also convert the sum signal into a digital signal; supply the digital signal to the system controller 32; and detect a peak value and a bottom value by means of the system controller 32, thereby computing a β value.

Moreover, in the present embodiment, test data are tentatively written by use of all of the five wobble periods in the APC area in the guard area. However, arbitrary periods among the five wobble periods in the APC area can also be used as an area where test data are to be tentatively written. The size of that area may also be fixed or variable. When the size of the area is made variable, it is preferable to make settings such that the size of the area becomes greater sequentially according to a necessity for adjusting recording power. For instance, in the inner track of the optical disk 10, power is changed in only three steps by use of only three wobble periods. In the outer track of the same, power is changed in five steps by use of all of the wobble periods. Thus, the size of the are is variably adjusted according to a radial position on the optical disk 10. Alternatively, the size of the area where test data are to be tentatively written may also be variably adjusted according to the type of the optical disk 10. When only the three wobble periods are used for tentatively writing test data, the two remaining wobble periods can be used for APC that is the original objective.

What is claimed is:

1. An optical disk drive for recording user data in a plurality of recording blocks,
   the optical disk drive comprising:
   an optical pickup configured to radiate a recording laser beam; and
   a controller configured to cause the optical pickup to radiate the recording laser beam on an APC portion of one of the plurality of recording blocks, the recording laser beam causing ROPC (Running Optimum Power Control) test data to be recorded in the APC area, and
   the recording laser beam being repeatedly adjusted pursuant to ROPC during recording of the ROPC test data in the APC portion of the one of the plurality of recording blocks, a size of a remaining part of the APC portion being variably adjusted depending on an inserted optical disk.

2. The optical disk drive according to claim 1, wherein a length of the ROPC test data is longer than a length of the user data to be recorded in the one of the plurality of recording blocks.

3. The optical disk drive according to claim 1, wherein a recording strategy for ROPC test data is the same as a recording strategy for the user data to be recorded in the one of the plurality of recording blocks.

4. The optical disk drive according to claim 1, wherein the controller is configured to adjust the power P of the recording laser beam according to a value of level B, which is the amount of light reflected at a timing when the amount of reflected light has become stable as a result of formation of pits, when the ROPC test data are recorded.

5. The optical disk drive according to claim 4, wherein the controller is configured to compute $B/P^n$ ("n" is a real number of one or more) from the power P of the recording laser beam acquired when the ROPC test data are recorded and the value of level B, and adjusts the power of the recording laser beam according to $B/P^n$.

6. The optical disk drive according to claim 4, wherein the controller is configured to record the ROPC test data to change the power of the recording laser beam, and adjust the power of the recording laser beam according to the value of level B in the power of the recording laser beam.

7. The optical disk drive according to claim 1, wherein the size of the remaining part of the APC portion is variably adjusted according to a radial position of the APC portion on the inserted optical disk.

8. An optical disk drive for recording user data in a plurality of recording blocks,
   the optical disk drive comprising:
   an optical pickup configured to radiate a recording laser beam; and
   a controller configured to adjust recording power of the recording laser beam by interrupting data recording during recording of the user data in a recording block from the plurality of recording blocks,
   the controller is further configured to record test data in a non-user data area of the recording block when the user data recording is interrupted, and configured to repeatedly adjust the power of the recording laser beam during recording of the test data in the non-user data area according to a relationship between the quality of a signal acquired by reproduction of the test data and the power used to record the test data, the non-user data area being variably adjusted according to a type of an inserted optical disk.

9. The optical disk drive according to claim 8, wherein the controller is configured to evaluate a quality of user data recorded immediately before interruption, and adjust the power of the recording laser beam according to the quality of the user data recorded immediately before interruption as well as according to a relationship between the quality of the signal acquired by reproduction of the test data and the power used to record the test data.

10. The optical disk drive according to claim 8, wherein the non-user data area is a guard area subsequent to a run-out area.

11. The optical disk drive according to claim 10, wherein the non-user data area is an APC area which is provided in the guard area for adjusting power.

12. The optical disk drive according to claim 8, wherein the controller is configured to interrupt user data recording when user data have been recorded to a set length or when user data have been recorded for a period of recording time.

13. The optical disk drive according to claim 8, wherein the controller interrupts the data recording when an amount of change in temperature has been detected.

14. The optical disk drive according to claim 8, wherein the controller interrupts the data recording when under-running of a buffer has been detected.

15. The optical disk drive according to claim 9, wherein the controller computes a relationship between the quality Q of a signal resulting from reproduction of the test data and power P of the signal as $Q=f(P)+\alpha$, where $\alpha$ is an offset, and computes the offset $\alpha$ by use of power Po and signal quality Qo of the user data recorded immediately before interruption.

16. The optical disk drive according to 8, wherein the non-user data area is an APC area used for adjusting power, and an area in the APC area where the test data are to be recorded is variably adjusted according to the type of the inserted optical disk.

17. The optical disk drive according to 8, wherein the non-user data area is an APC area used for adjusting power, and an area in the APC area where the test data are to be recorded is variably adjusted according to a radial position of the APC area on the inserted optical optical disk.

* * * * *